Patented Feb. 11, 1936

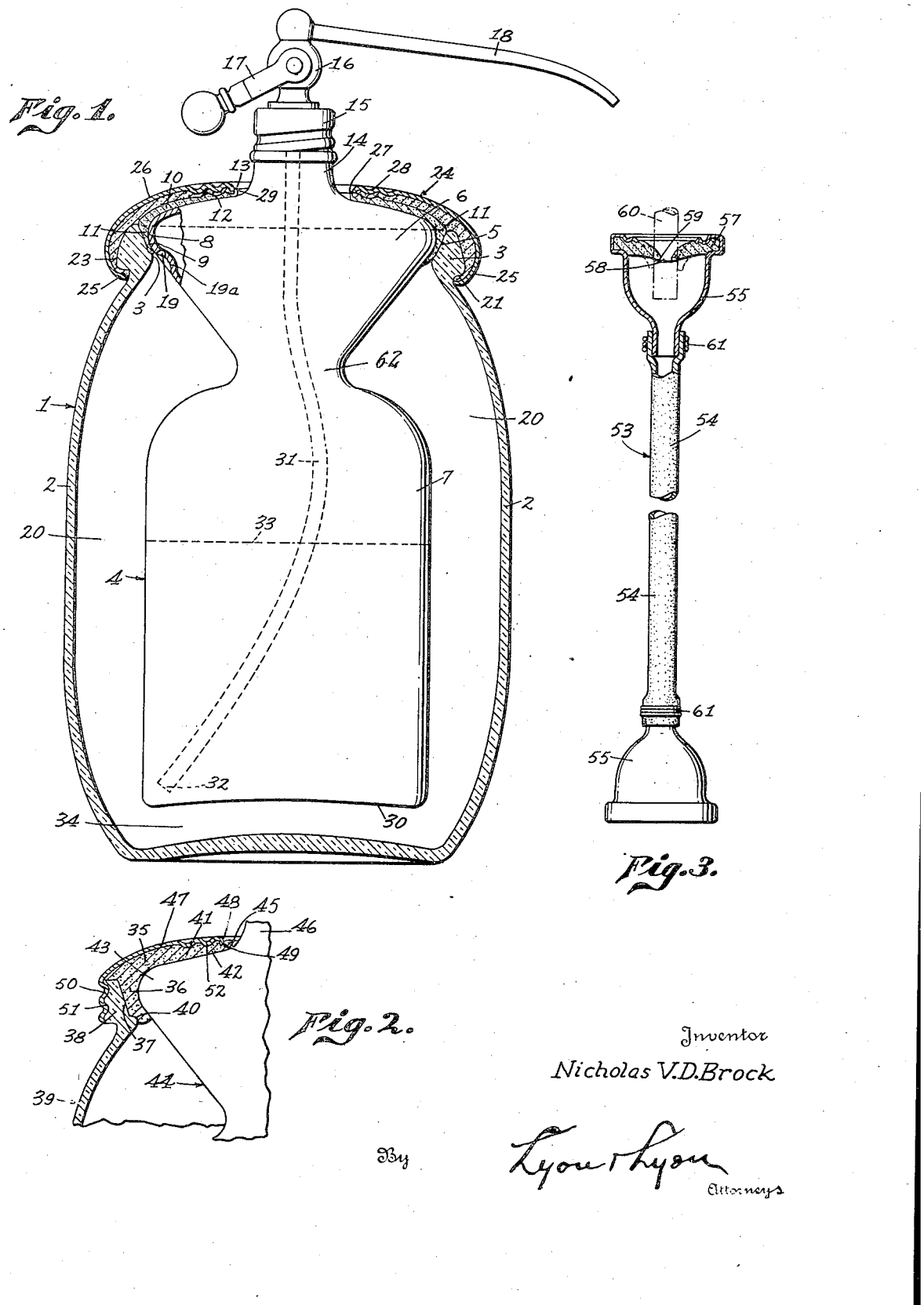

2,030,569

UNITED STATES PATENT OFFICE 2,030,569

DISPENSING APPARATUS FOR CHARGED BEVERAGES

Nicholas V. D. Brock, Santa Ana, Calif.

Application July 18, 1934, Serial No. 735,761

10 Claims. (Cl. 215—12)

This invention relates to a dispensing container to be used for dispensing gas-charged beverages such as carbonated water, or beer. It is not feasible to fill a small glass container or jar with beer, maintained under the pressure which it normally has when flowing from the beer tap, because if the beer in the container is sealed tight so as to retain its pressure, a pressure will be developed within the container, which would be sufficient to burst a glass container, or jug. Furthermore, if a single-walled container were provided of sufficient strength to retain the pressure developed on the interior, it would necessarily be relatively heavy, which would interfere with carrying it to a point where the beverage was to be consumed. If the beverage was to be maintained at the cold temperature which it should have when placed in the container, it would be found necessary to ice the container to keep the beverage cool, on account of the fact that the walls of the container would rapidly take up heat from the surrounding atmosphere.

One of the objects of this invention is to provide a double-walled container of simple construction, in which the inner container is surrounded by an insulating space separating its wall from the wall of the outer container, and so constructed as to relieve the inner container of internal pressure due to the presence of the beverage.

A further object is to provide a double-walled container of simple construction as suggested above, having means for enabling the gas pressure from the liquid to be admitted to the annular insulating space, and having improved means for insuring that the gas pressure in the insulating space, can be sealed and retained. By accomplishing this, it is possible to insulate the contained beverage to such an extent that it will maintain the low temperature which it had when placed in the container, and it is also possible to utilize the gas pressure to dispense the beverage from the inner container by opening a gas-tight valve which is connected with a dispensing nozzle, The invention concerns itself particularly with the correlated construction of the inner container, the outer container, and a cap, together with a gasket or gaskets with which the cap cooperates, and one of the objects of the invention is to combine these parts in such a relation as to insure that the cap in cooperation with the gasket or gaskets, will insure the perfect sealing of the gas pressure in the annular insulating space.

Further objects of the invention will appear hereinafter.

The invention consists in the novel parts and combination of parts to be described hereinafter, all of which contribute to produce an efficient dispensing apparatus for charged beverages.

A preferred embodiment of the invention is described in the following specification, while the broad scope of the invention is pointed out in the appended claims.

In the drawing:

Fig. 1 is a vertical section through a dispensing container embodying my invention, and illustrates the outer container in cross-section, while the inner container is shown generally in side elevation, although a portion of the same is broken away and shown in cross-section. This view illustrates an embodiment of the invention in which I employ two gaskets for effecting the sealing of the gas pressure in the annular insulating space.

Fig. 2 is a fragmentary view and a vertical section showing a portion of the upper end of an outer container, and a contiguous portion of the inner container. The bodies of the outer container and inner container, are broken away, and this view particularly illustrates another embodiment of the invention in which I employ a single gasket.

Fig. 3 is a side elevation in partial section, illustrating a filling device which I employ, to enable my dispensing container to be filled with a gas-charged liquid from an ordinary faucet or spigot, such as a beer tap.

Referring more particularly to the parts, and especially to Fig. 1, I indicates an outer container which may be made of relatively thick glass, and the wall 2 of this outer container may have substantially the profile indicated in Fig. 1. In other words, this outer container is in the form of a relatively large glass jar. If desired, this outer container may be enveloped in a wire basket (not illustrated), which would fit the exterior of the bottle, and be provided with a bail for carrying the container. The upper end of the outer container is formed of a mouth 3 of relatively large diameter, so that the inner container 4 can readily be introduced through the upper opening in this outer container. This mouth 3 should be of considerable cross-section to enable it to withstand considerable pressure. It is provided with an inner substantially conical seat 5. The inner container 4 is preferably formed of a head 6 at its upper end, of slightly larger diameter than the lower portion or body 7 of the inner container, and this head 6 presents an annular convex shoulder 8, the under side 9 of which is substantially conical, so as to cooperate with the conical seat 5. In the embodiment of the invention illustrated in Fig. 1, I provide an inner gasket 10, which has a substantially conical portion 11 that lies between the seat 5 and the conical portion 9 of the shoulder 8, so that this portion of the gasket can be pinched between these two faces.

The upper portion of the inner gasket 10 is of disc-form, and lies on the upper face 12 of the shoulder, which is preferably slightly conical as shown. The gasket 19 is of annular form so as to present a central opening 13 through which the neck 14 of the inner container extends upwardly. This neck should be provided with a gas-tight cap 15, carrying a gas-tight valve 16 having a handle 17 for enabling the same to be opened to permit the beverage to flow in or out of the nozzle 18 that leads off from the valve.

The wall of the shoulder 8 is provided with a vent 19, which opens communication between the interior of the inner container 4, and the cover or cap 24 is forcibly crimped inwardly to form a flange 25 that forcibly presses the apron 23 of the gasket against the under side of the shoulder 21. The body 26 of the cover 24 is of concavo-convex disc-form, and has a central opening 27 through which the neck 14 extends upwardly. The sheet metal cap 24 is provided with means for stiffening it to prevent its "giving" upwardly under pressure from below. This means preferably consists of a plurality of corrugations 28 adjacent the opening 13, and these corrugations pinch the two gaskets together and will make a substantially gas-tight seal, but I prefer, in order to insure a perfect gas-tight seal, to provide an inwardly bent edge 29 at the opening 27, through the cap 24. This inwardly turned edge 29 bites into the material of the gasket or gaskets, and insures a tight seal, and furthermore, these corrugations prevent any upward movement of the body portion of the cap 24, which might relieve the pressure of the shoulder against the conical seat 11. In this connection it should be understood that there is a considerable unbalanced pressure against the bottom 30 of the inner container, tending to force it out of the mouth of the outer container. These corrugations 28 stiffen the cover of the cap 24 and effectively resist this force, tending to push the inner container outwardly.

The small cap 15 carries a tube 31 that communicates with the nozzle 18, and which extends down so that its inner end 32 is located near the bottom 30 and near the side wall of the inner container.

When the inner container has been filled with the gas-charged beverage, for example, beer, the interior of the inner container above the level 33 of the beverage, will carry gas under pressure, and this pressure is admitted through the vent 19 to the annular space 20. In this way the pressure on the interior of the inner container is balanced by the pressure on its exterior, and consequently there is no strain on the inner container, except that due to the weight of the beverage within it, and of course, the compression stress developed in the gaskets.

The fact that the bottom 30 of the inner container is elevated above the bottom of the outer container 2, gives an insulating space 34.

In the embodiment of the invention illustrated in Fig. 2, I employ a single gasket 35 that has a substantially conical portion 36 that seats upon a substantially conical seat 37 at the mouth 38 of the outer container 39. If desired, I may provide the lower portion of the conical seat 37 with a projecting bead 40, which will bite into the gasket when the connection is tightened up. Obviously, this bead 40 could be employed also in the embodiment of the invention illustrated in Fig. 1.

The gasket 35 has a concavo-convex disc-portion 41 that lies on the upper face 42 of the shoulder 43 of the inner container 44. The gasket has a central opening 45 through which the neck 46 of the inner container projects upwardly. I employ a cap or cover 47 similar to that illustrated in connection with Fig. 1, and having a central opening 48, the edge 49 of which is turned inwardly so as to form an edge to bite into the upper side of the gasket when the cover or cap 47 is secured in place. If desired, this cap may be secured in place as illustrated in Fig. 1, but in this embodiment of the invention I prefer to provide the cap with a flange having spun threads 50 to cooperate with threads 51 formed on the outer side of the mouth of the outer container. This enables the cap to be screwed into place so as to clamp the part 36 of the gasket firmly against the seat 37, and against the bead 40.

Adjacent the turned-in edge 48, the disc-portion of the cap 47 is provided with corrugations 52. These corrugations stiffen the material at this point, and prevent any possibility of the upward pressure on the inner container loosening up the connection.

By using the corrugations in the cap, it is possible to form a cap of relatively thin sheet metal. This reduces the expense of the apparatus, and also facilitates the crimping-in operation of the Fig. 1 construction when the flange 25 is crimped under the external shoulder 23 on the outer container. Also by forming this metal cap of thin material, the turned-in edges 29 and 49 have a small area, and therefore the pressure developed on this area against the rubber gasket, is very high, and will operate efficiently to prevent any possible leakage of gas.

In order to facilitate filling the inner container with any gas-bearing liquid or beverage such as beer, I prefer to employ a filling device 53, which is preferably constructed as illustrated in Fig. 3. It includes a flexible tube 54 connected at its ends to two heads 55 formed of light sheet metal, and these heads carry soft rubber washers 57, clamped securely at their outer ends. Each of these rubber washers 57 has a central opening 58 with a substantially conical mouth 59 on its outer side. By shoving this washer 57 over a filling tube or spigot as indicated by the dotted lines 60 in Fig. 3, the edge of the opening 58 will become turned inwardly against the side face of the filling tube or spigot. As soon as the charged liquid commences to flow through, the back pressure on the edge or lip of the washer, will make a tight joint and prevent loss of any gas flowing into the liquid. The connection between the tube and the head 55 is a tight connection, and this can be effected by wrapping the connection tightly with wire 61. This action is illustrated by the dotted lines in Fig. 3. The tube or nozzle 18 is inserted in the washer 57 located at the other end of the filling device, and the charged beverage flows through the open valve 16 into the inner container.

It will be evident that by practicing my invention, a container of simple construction will be provided that will maintain a refrigerated gas-bearing liquid at a low temperature for a considerable period, on account of the insulating spaces surrounding the inner container. Furthermore, the gas passing off of the liquid and collecting in the space above the liquid in the inner container and in the insulating space 20, will develop pressure on the upper surface 33 of the liquid, to enable the liquid to be discharged whenever the valve 16 is opened.

The vent 19 is preferably formed at the bottom of a slight inward depression 19a formed in the wall of the inner container at this point. The use of this depression is advisable because it facilitates a complete draining of the insulating space, which can be accomplished by inverting the container and holding it with its axis inclined, so that the vent 19 will become the lowest point of the insulating space. It may be necessary to drain the insulating space 20 from time to time, due to the fact that condensation may take place in this chamber, depositing moisture within same.

The container 4 is preferably formed with a contracted neck 62. The container should be filled to a point just below this neck. The neck 62 cooperates with the conical head 6 to prevent the beverage from splashing up into the head while the apparatus is being transported. In this way splashing of the beverage through the vent 19 is prevented.

What I claim is:

1. In a dispensing container for dispensing gas-charged beverages under pressure, the combination of an outer container with a mouth having an annular seat, an inner container with an annular shoulder adjacent said seat, and having an upwardly extending neck, a gasket pinched between the shoulder and the seat and having an extension overlying the upper side of the shoulder, and a cap having a central opening receiving the said neck, having a flange at its outer edge for securing the same to the outer container, said cap having annular corrugations adjacent the edge of its central opening for pinching the adjacent portion of the gasket against the upper side of the shoulder, the walls of said containers being disposed apart so as to form an annular insulating gas chamber surrounding the inner container, the wall of the inner container having a vent therethrough for admitting the gas pressure above the beverage to the said annular insulating space, to balance the pressure on the interior of the inner container, said cap cooperating with the gasket and the containers to seal and retain the gas pressure in the annular space.

2. In a dispensing container for dispensing gas-charged beverages under pressure, the combination of an outer container with a mouth having an annular seat, an inner container with an annular shoulder adjacent said seat, and having an upwardly extending neck, a gasket pinched between the shoulder and the seat and having an extension overlying the upper side of the shoulder, and a cap having a central opening receiving the said neck, having a flange at its outer edge for securing the same to the outer container, said cap having annular corrugations adjacent the central opening, said central opening having an inwardly projecting edge for biting into the adjacent portion of the gasket to pinch the same against the upper side of the shoulder, the walls of said container being disposed apart so as to form an annular insulating gas chamber surrounding the inner container, the wall of the inner container having a vent therethrough for admitting the gas pressure to the said annular insulating space to balance the pressure on the interior of the inner container, said cap cooperating with the gasket and the containers to seal and retain the gas pressure in the annular space.

3. In a dispensing container for dispensing gas-charged beverages under pressure, the combination of an outer container with a mouth having an annular seat, said mouth having an annular bead at the lower portion of the seat, an inner container with an annular shoulder adjacent said seat and having an upwardly extending neck, a gasket having a substantially conical portion pinched between the shoulder and said annular bead, said gasket having a disc-form portion lying on the upper side of the said shoulder, and a cap having a central opening receiving the said neck, said cap having a flange at its outer edge secured to the outer container, said cap having annular corrugations adjacent its central opening and having an inwardly projecting edge at said central opening for pinching the disc portion of the gasket against the upper side of the shoulder, the walls of said containers being disposed apart so as to form an annular insulating gas chamber surrounding the inner container, the wall of the inner container having a vent for admitting the gas pressure above the beverage to the annular insulating space to balance the pressure on the interior of the inner container, said cap cooperating with the gasket and the containers to seal and retain the gas pressure in the annular space.

4. In a dispensing container for dispensing gas-charged beverages under pressure, the combination of an outer container with a mouth having an annular seat, an inner container with an annular shoulder adjacent said seat, and having an upwardly extending neck, a gasket pinched between the shoulder and the seat and having an extension overlying the upper side of the shoulder, and a cap having a central opening receiving the said neck, having a flange at its outer edge for securing the same to the outer container, the mouth of said outer container having an annular external shoulder, a second gasket disposed between the cap and the first-named gasket having its outer edge extending under the external annular shoulder of the outer container, said cap having an outer flange crimped forcibly inwardly under the said external shoulder for clamping the outer edge of the last-named gasket against the same, said cap having annular corrugations adjacent the inner edge of the central opening for pinching the adjacent portions of the gaskets against each other and against the upper side of the shoulder of the inner container, the walls of said containers being disposed apart so as to form an annular insulating gas chamber surrounding the inner container, the wall of the inner container having a vent for admitting the gas pressure above the beverage to the said annular insulating space for balancing the pressure on the interior of the inner container, said cap cooperating with the gaskets and the containers to seal and retain the gas pressure in the annular space.

5. In a dispensing container for dispensing beverages under pressure, the combination of an inner container to hold the beverage, an outer container enveloping the inner container, said containers having walls separated from each other so that a gas space is formed on the outer side of the wall of the inner container, said outer container having a mouth with a substantially conical seat face, said inner container having a head at its upper end with a substantially conical shoulder adjacent said seat, a gasket of compressible material between the shoulder and the seat, said gasket having an extension projecting over the upper side of the shoulder, and a cap seating over the gasket having means at its outer edge for securing the same to the mouth of the outer container, said cap having a central opening to receive the neck of the inner container and having means located at and around said central opening for stiffening the cap adjacent the opening, and operating to clamp the gasket down gastight against the upper face of said shoulder at the edge of said opening.

6. A dispensing container constructed as described in claim 5, in which the inner container is formed with a contracted neck having a substantially conical head above the neck, the said head being provided with a vent at its upper portion opening communication between the interior of the head and the gas space.

7. In a dispensing container for dispensing gas-charged beverages under pressure, the combination of an outer container with a mouth having an annular seat, an inner container with an annular shoulder adjacent said seat, a gasket pinched between the shoulder and the seat and having a part overlying the upper side of the shoulder, and a cap having a flange at its outer edge for securing the same to the outer container, the walls of said containers being disposed apart so as to form an annular insulating gas chamber surrounding the inner container, the wall of the inner container having a vent therethrough for admitting the gas pressure above the beverage to the said annular insulating space to balance the pressure on the interior of the inner container, said cap cooperating with the gasket and the containers to seal and retain the gas pressure in the annular space.

8. In a dispensing container for dispensing gas-charged beverages under pressure, the combination of an outer container with a mouth having an annular seat, an inner container with an annular shoulder adjacent said seat, a gasket pinched between the shoulder and the seat and having a part overlying the upper side of the shoulder, and a cap having a flange at its outer edge for securing the same to the outer container, the walls of said containers being disposed apart so as to form an annular insulating gas chamber surrounding the inner container, the wall of the inner container having a vent therethrough located just below said annular seat for admitting the gas pressure above the beverage to the said annular insulating space to balance the pressure on the interior of the inner container, said cap cooperating with the gasket and the containers to seal and retain the gas pressure in the annular space.

9. In a dispensing container for dispensing gas-charged beverages under pressure, the combination of an outer container with a mouth having an annular substantially conical seat, an inner container having a substantially cylindrical body with a contracted neck above the same and having a substantially conical head above the said contracted neck with the large end of the head disposed upwardly, said substantially conical head having a convex annular shoulder, a gasket extending under the said shoulder and located between the same and said annular seat, and a cap having a flange at its outer edge for securing the same to the outer container for pressing the annular shoulder downwardly to pinch the gasket between the same and the said substantially conical annular seat.

10. In a dispensing container for dispensing gas-charged beverages under pressure, the combination of an outer container with a mouth having an annular substantially conical seat, an inner container having a substantially cylindrical body with a contracted neck above the same and having a substantially conical head above the said contracted neck with the large end of the head disposed upwardly, said substantially conical head having a convex annular shoulder, a gasket extending under the said shoulder and located between the same and said annular seat, and a cap having a flange at its outer edge for securing the same to the outer container for pressing the annular shoulder downwardly to pinch the gasket between the same and the said substantially conical annular seat, the wall of said convex shoulder having a vent therethrough located adjacent said shoulder for permitting the gas from the beverage in the inner container to flow into the space between the walls of the containers.

NICHOLAS V. D. BROCK.